United States Patent Office 3,359,273
Patented Dec. 19, 1967

3,359,273
PROCESS FOR THE PRODUCTION OF 2-(INDOL-3-YLMETHYL)-4-METHYLPYRIDINE
John Shavel, Jr., Mendham, and Glenn C. Morrison, Dover, N.J., assignors to Warner-Lambert Pharmaceutical Company, Morris Plains, N.J., a corporation of Delaware
No Drawing. Original application Dec. 9, 1963, Ser. No. 329,219, now Patent No. 3,264,310, dated Aug. 2, 1966. Divided and this application Dec. 10, 1965, Ser. No. 513,102
1 Claim. (Cl. 260—296)

ABSTRACT OF THE DISCLOSURE

A process for the production of a compound of the formula:

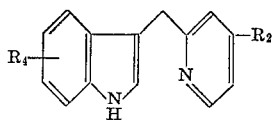

by reacting a compound of the formula:

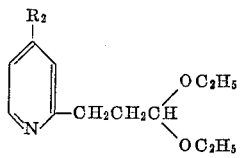

with a phenyl hydrazine.

---

This is a divisional application of our copending application Ser. No. 329,219, filed on Dec. 9, 1963, now Patent No. 3,264,310, granted Aug. 2, 1966.

This invention relates to new and useful heterocyclic compounds and relates more particularly to new and novel indolomorphans having the formula:

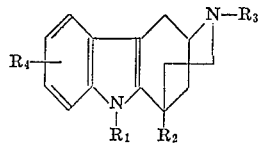

wherein $R_1$ represents hydrogen, lower alkyl of 1 to 6 carbons such as methyl, ethyl, propyl, isopropyl, butyl, isobutyl, n-hexyl and the like, cycloalkyls such as cyclopropyl, cyclobutyl, aralkyl such as phenylethyl, substituted aralkyl such as chlorobenzyl, cycloalkylmethyl, such as cyclopropylmethyl, acyl such as acetyl, benzoyl and the like, and $R_2$ represents lower alkyl of 1 to 6 carbons such as methyl, ethyl, propyl, isopropyl, butyl, isobutyl, n-hexyl and the like, cycloalkyl such as cyclopropyl, cyclobutyl, aralkyl such as phenylethyl, substituted aralkyl such as chlorobenzyl, phenyl, and substituted phenyl such as chlorophenyl, and $R_3$ represents lower alkyl of 1 to 6 carbons such as methyl, ethyl, propyl, isopropyl, butyl, isobutyl, n-hexyl and the like, cycloalkyls such as cyclopropyl, cyclobutyl, aralkyl such as phenethyl, substituted aralkyl such as chlorobenzyl, cycloalkylmethyl such as cyclopropylmethyl, aralkyl such as phenethyl and substituted β-phenethyl, such as p-nitro-β-phenethyl and p-amino-β-phenethyl, alkenyl such as dimethylallyl and allyl, and $R_4$ represents hydrogen, halogen such as fluorine, chlorine and bromine, lower alkyl of 1 to 6 carbons such as methyl, ethyl, propyl, isopropyl, butyl, isobutyl, n-hexyl and the like, cycloalkyls such as cyclopropyl, cyclobutyl, aralkyl such as phenethyl, substituted aralkyl such as chlorobenzyl, cycloalkylmethyl such as cyclopropyl-methyl, lower alkoxy such as methoxy and ethoxy, nitro, amino, and hydroxyl.

Also embraced within the scope of this invention are the pharmaceutically accepted acid addition salts of the afore-described indolomorphans and their quaternary ammonium salts. The symbols $R_1$, $R_2$, $R_3$ and $R_4$ as used hereinafter have the meaning defined above.

This invention also includes within its scope a new and novel process for preparing the above compounds as well as the intermediates employed for their synthesis.

The new and novel compounds of this invention have interesting and significant pharmacological activity and are useful as analgesics, anti-tussive and anti-inflammatory agents. In addition they are valuable intermediates in the production of other compounds of the indolomorphan series.

The compounds of this invention may be prepared by reacting a 2-methyl-4-substituted pyridine of the formula:

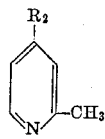

with phenyl lithium and then with diethyl bromoacetal,

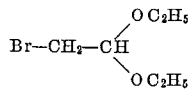

to form the intermediates of the formula:

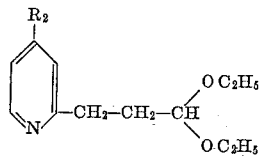

The above reaction is usually carried out at ambient temperature such as from 15° to 30° C. employing organic solvents such as ethyl ether as the reaction medium. The intermediate obtained as the product of the latter reaction is then refluxed with an acidic aqueous solution of a phenyl hydrazine hydrochloride to form an indole compound having a nucleus of the formula:

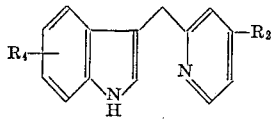

I

The second step involves the conversion of Compound I above into a quaternary salt by reacting with a compound of the formula $R_3Y$ in which Y may be a halide radical such as iodide, bromide, or p-toluene sulfonate. The desired reaction takes place readily at ambient temperature with the formation of a compound of the formula:

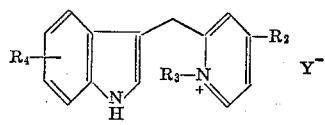

II

Reduction of Compound II with an alkali borohydride in water, alcohol or other suitable solvents results in the formation of the isomeric compounds of the formula:

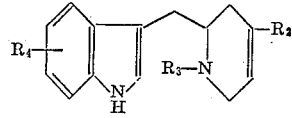

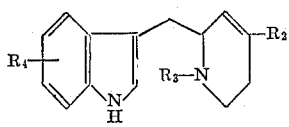

This reduction is effected at about 50° to 60° C. for a period of two hours.

These iomers may be readily separated, for example, by chromatographic techniques. Thus, the isomeric mixture may be chromatographed on alumina and the column then eluted with ether. The 1,2,5,6 tetrahydro isomer is eluted in the first few ether fractions while the 1,2,3,6 isomer appears and is recovered from the later ether fractions by evaporation of the solvent.

However, the isomeric mixtures may be subjected to further reaction by which they are cyclized, without first undergoing separation into the respective components, and this cyclization gives the desired indolomorphans of this invention wherein $R_1$ is hydrogen. These compounds may be represented by the formula:

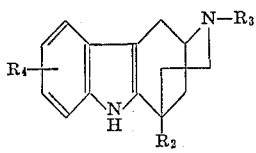

The above cyclization reaction is usually effected by heating with acidic agents such as phosphoric acid, polyphosphoric acid, hydrobromic acid, and the like at a temperature of about 150° and 175° under an atmosphere of nitrogen.

Finally, Compound V may be methylated employing agents such as dimethylcarbonate in the presence of sodium hydride to form a 6-methyl substituted indolomorphan of the formula:

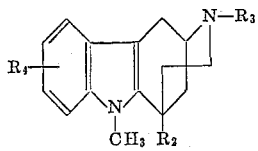

Similarly, compounds where $R_1$ are as previously defined may be prepared by alkylation or acylation of Compound V by appropriate chemical means.

The foregoing synthesis may be conveniently illustrated by the following schematic diagram:

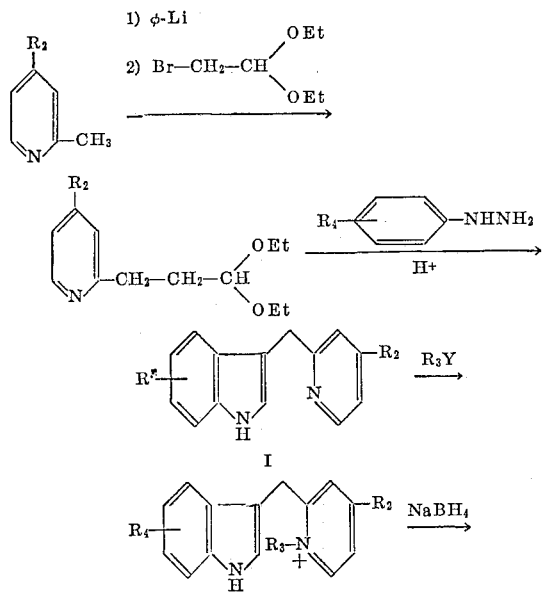

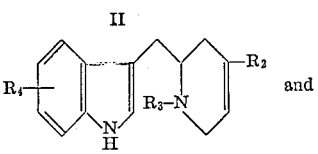

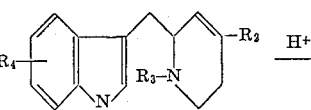

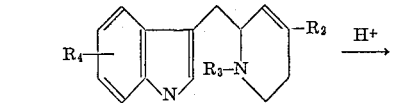

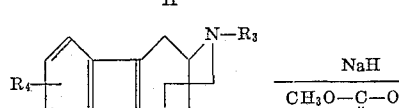

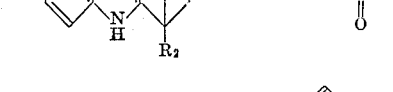

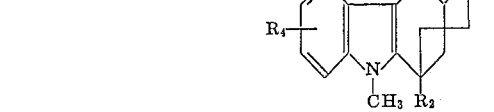

The compounds of our invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric phosphoric and nitric acids. The acid addition salts may be prepared in the conventional manner by treating a solution or suspension of the free base in an organic solvent with the desired acid and the salt which forms is recovered by crystallization techniques. The quarternary salts are prepared by heating a suspension of the free base in a solvent with a reactive halide such as methyl iodide, ethyl bromide, n-hexyl bromide, benzyl chloride, or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following example is included in order further to illustrate the present invention. All temperatures are given in degrees Centigrade.

*Example 1.—2-(indol-3-ylmethyl)-4-methylpyridine*

To 4.68 g. of lithium ribbon suspended in 135 ml. of ether is added a solution of 58.0 g. of bromobenzene in 68 ml. of either at a rate such that gentle reflux is maintained. Stirring is continued for an additional two hours and the solution allowed to stand for 18–24 hours overnight. Then 36.1 g. of 2,4-lutidine is added at a rate such that the solution just refluxes and after the addition has been completed, stirring is continued for an additional 90 minutes. A solution of 73.2 g. of diethyl bromoacetal in 135 ml. of ether is added with ice bath cooling at a rate such that the temperature remains between 15° and 20°, and then the solution is stirred for an additional 90 minutes. After standing for 18–24 hours, the reaction mixture is poured into a mixture of 180 g. of ice and 270 ml. of water. The ether layer is removed, washed with 225 ml. of water, dried over sodium sulfate and the solvent removed. Distillation of the residue gives 40 g. of an oil, B.P. 87°–95° (0.02 mm.), which is refluxed for 18 hours with 26 g. of phenyl hydrazine hydrochloride, 36 ml. of sulfuric acid and 900 ml. of water. The reaction mixture is made basic with 40% sodium hydroxide solution and extracted with ether. The ethereal layer is washed with water, dried over sodium sulfate and the solvent removed, The residue is dissolved in 200 ml. of hot benzene and 200 ml. of Skelly B (n-hexane) added. On standing there is deposited 2-(indol-4-ylmethyl)-4-methylpyridine as a buff, crystalline solid, M.P. 127°–129°. Further recrystallization gives an analytical sample, M.P. 130°–131°;

$\nu_{max.}^{Nujol}$: 725, 1605 cm$^{-1}$; $\nu_{max.}^{CHCl_3}$: 1605, 3340 cm$^{-1}$; $\lambda_{max.}^{EtOH}$: 221 m$\mu$ (36,000), 267 (7,900), 279 (7,000), 290 (5,500)

Analysis for $C_{15}H_{14}N_2$.—Calcd: C, 81.05; H, 6.35; N, 12.60. Found: C, 81.03; H, 6.53; N, 12.39.

We claim:

Process for the production of a compound of the formula:

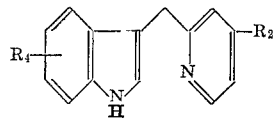

wherein $R_2$ is lower alkyl of 1 to 6 carbons, and $R_4$ is hydrogen which comprises reacting a compound of the formula:

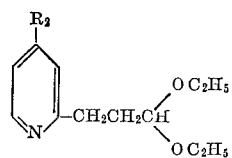

with a phenyl hydrazine in an acidic medium.

References Cited

UNITED STATES PATENTS 3,136,770   6/1964   Gray _____ 260—2!

OTHER REFERENCES

Woodward et al., J. Am. Chem. Soc. vol. 81, p. 44? (1959).

Miller, J. Am. Chem. Soc., vol. 75, p. 4849 (1953).

JOHN D. RANDOLPH, Primary Examiner.

WALTER A. MODANCE, Examiner.

A. L. ROTMAN, Assistant Examiner.